(12) United States Patent
Chuang

(10) Patent No.: US 10,020,695 B2
(45) Date of Patent: Jul. 10, 2018

(54) MOTOR STATOR DEVICE WITH SIMPLE COIL-WINDING STRUCTURE

(71) Applicant: Able Enterprise Co., Ltd., New Taipei (TW)

(72) Inventor: Yen-Peng Chuang, New Taipei (TW)

(73) Assignee: ABLE ENTERPRISE CO., LTD., New Taipei (TW)

( * ) Notice: Subject to any disclaimer, the term of this patent is extended or adjusted under 35 U.S.C. 154(b) by 392 days.

(21) Appl. No.: 14/806,648

(22) Filed: Jul. 23, 2015

(65) Prior Publication Data

US 2017/0025912 A1    Jan. 26, 2017

(51) Int. Cl.
  *H02K 3/28* (2006.01)
  *H02K 1/14* (2006.01)
  *H02K 29/03* (2006.01)

(52) U.S. Cl.
  CPC .............. *H02K 1/148* (2013.01); *H02K 3/28* (2013.01); *H02K 29/03* (2013.01)

(58) Field of Classification Search
  CPC .... H02K 3/522; H02K 2203/12; H02K 3/255; H02K 3/18; H02K 3/527; H02K 3/48; H02K 3/487; H02K 3/493
  USPC ........................................ 310/194, 214, 215
  See application file for complete search history.

(56) References Cited

U.S. PATENT DOCUMENTS

| | | | | |
|---|---|---|---|---|
| 6,744,166 B2* | 6/2004 | Harter | .................... | H02K 1/148 310/214 |
| 8,450,898 B2* | 5/2013 | Sears | ..................... | H02K 3/522 310/194 |
| 9,013,086 B2* | 4/2015 | Dokonal | ................ | H02K 1/148 310/216.009 |
| 9,130,423 B2* | 9/2015 | Uchitani | ................ | H02K 1/274 |
| 9,614,406 B2* | 4/2017 | Johnson | ................. | H02K 3/487 |
| 2002/0047457 A1* | 4/2002 | Yoshikawa | ............ | H02K 3/345 310/215 |

* cited by examiner

*Primary Examiner* — Joshua Benitez Rosario
*Assistant Examiner* — Leda Pham
(74) *Attorney, Agent, or Firm* — Cheng-Ju Chiang

(57) ABSTRACT

A motor stator device with simple coil-winding structure is disclosed. The motor stator device includes an insulating base comprising an outer ring base, an inner ring base and a connection base, the outer ring base and the inner ring base alternatively forming outer ring openings, inner ring openings, outer ring sinks and inner ring pillars, the connection base being provided to be wound with a metal coil; a plurality of stator segments being positioned on the insulating base; and a plurality of segment connectors being positioned on the outer ring sinks between the insulating base and the stator segments and having a base part and an extension part opposite to the base part, the extension part being integrally extended from the base part and toward the motor rotor to get close to the inner ring pillar next to the motor rotor, so as to decrease the cogging torque.

7 Claims, 4 Drawing Sheets

MOTOR STATOR DEVICE WITH SIMPLE COIL-WINDING STRUCTURE

BACKGROUND OF THE INVENTION

1. Field of the Invention

The present invention relates to a motor stator device, and more particularly to a motor stator device with simple coil-winding structure capable of decreasing the cogging torque to improve the noise and energy waste, and capable of improving the convenience and efficiency of the winding operation and thus promoting economic performance and market competitiveness.

2. Related Art

Conventionally, a motor has a stator and a rotor, wherein the stator includes an outer ring portion, a connection portion and an inner ring portion. The outer ring portion is a closed circular body. The inner ring portion has openings that are disposed at intervals. The connection portion is connected between the outer ring portion and the inner ring portion. The inner ring portion is used for receiving the rotor. The connection portion is wound with a metal coil in a lengthwise direction. When current is conducted to the metal coil, the stator forms an electromagnet to drive the rotation of the rotor. Because the outer ring portion is a closed body, the coil-winding machine winds the metal coil in an inner winding manner at both sides of the connection portion from the openings of the inner ring portion. However, this inner winding manner can only be adapted for large-scale inner winding motors. For small-scale inner winding motors, the inner winding manner is usually carried out by hand, especially for the small-scale inner winding motors with high rotation speed. For the small-scale inner winding motors with high rotation speed, the diameter of the metal coil is large and the winding circle number is less. It is quite impossible to perform the inner winding manner for the small-scale inner winding motor by the coil-winding machine. Yet, it seems time-consuming when performing it by hand, thus resulting in low productivity.

Furthermore, there are often problems with unsmooth rotation of rotor resulted from the effect of cogging torque during operations. The cogging torque arises from the magnetic lines of force formed between the stator and the rotor, leading to the variation of torques and the jerky run of the rotor in particular at low speed, therefore causing noise and energy waste.

Moreover, the conventional stator is shaped by stacking a plurality of silicon steel sheets with same structure. Each of the silicon steel sheets has a convex ridge thereon by which the silicon steel sheets are combined as a whole in injection molding. However, the convex ridge is usually designed as circular shape, which brings in instability in combination of the silicon steel sheets, and leads to structural weakness of the stator.

SUMMARY OF THE INVENTION

Accordingly, an object of the present invention is to provide a motor stator device capable of decreasing the cogging torque to improve the noise and energy waste, and capable of improving the convenience and efficiency of the winding operation and thus promoting economic performance and market competitiveness.

Another object of the present invention is to provide a motor stator device having preferable stability in combination of the silicon steel sheets, so as to strengthen the structure of the stator.

To achieve the above-mentioned objects, the motor stator device encompassing a motor rotor includes an insulating base, a plurality of stator segments and a plurality of segment connectors, wherein the insulating base comprising an outer ring base, an inner ring base and a connection base. The connection base is secured between the outer ring base and the inner ring base. The outer ring base and the inner ring base are arc and respectively form a plurality of outer ring openings and a plurality of inner ring openings, the outer ring openings and the inner ring openings are communicated with each other to define holding spaces inside the connection base. The outer ring base and the inner ring base respectively form a plurality of outer ring sinks and a plurality of inner ring pillars. The outer ring sinks are alternatively arranged with the outer ring openings on the outer ring base while the inner ring pillars are arranged with the inner ring openings on the inner ring base. The connection base is provided to be wound with a metal coil. The stator segments are positioned on the insulating base. Each of the stator segments is shaped by stacking a plurality of silicon steel sheets with same structure. Each of the stator segments is arc and comprises an outer ring portion, an inner ring portion and a connection portion. The connection portion is secured between the outer ring portion and the inner ring portion. The connection portion is disposed in the holding space while the outer ring portion and the inner ring portion are respectively butted on outer edges of the outer ring opening and the inner ring opening. The segment connectors are positioned on the outer ring sinks between the insulating base and the stator segments. Each of the segment connectors is shaped by stacking a plurality of silicon steel sheets with same structure. Each of the segment connectors is arc and has a base part and an extension part opposite to the base part. The extension part is integrally extended from the base part and toward the motor rotor to get close to the inner ring pillar next to the motor rotor. Each of the silicon steel sheets of the stator segments has two separate convex ridges thereon which are both rectangular in shape and mutually perpendicular in orientation so as to bring preferable stability in combination of the silicon steel sheets in injection molding. Each of the silicon steel sheets of the segment connectors has a convex ridge which is rectangular in shape so as to bring preferable stability in combination of the silicon steel sheets.

In according with the present invention, interfaces among the outer ring base, the connection base and the inner ring base are defined as arc curved faces so as to expand winding space for facilitating winding operation.

DESCRIPTION OF THE PREFERRED EMBODIMENTS

Figure 1:
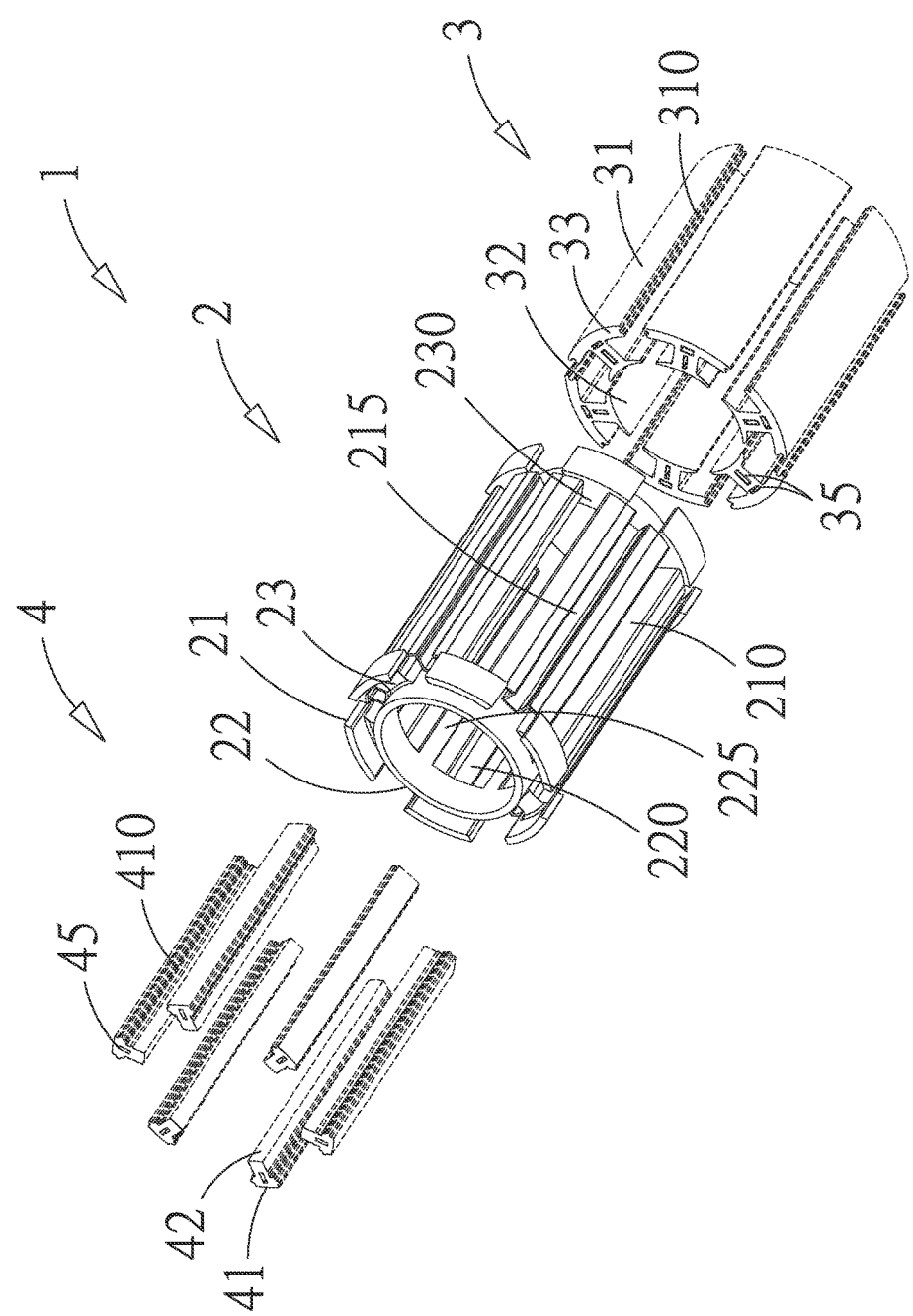
FIG. 1 is an exploded perspective view of the motor stator device of the present invention.
Figure 2:
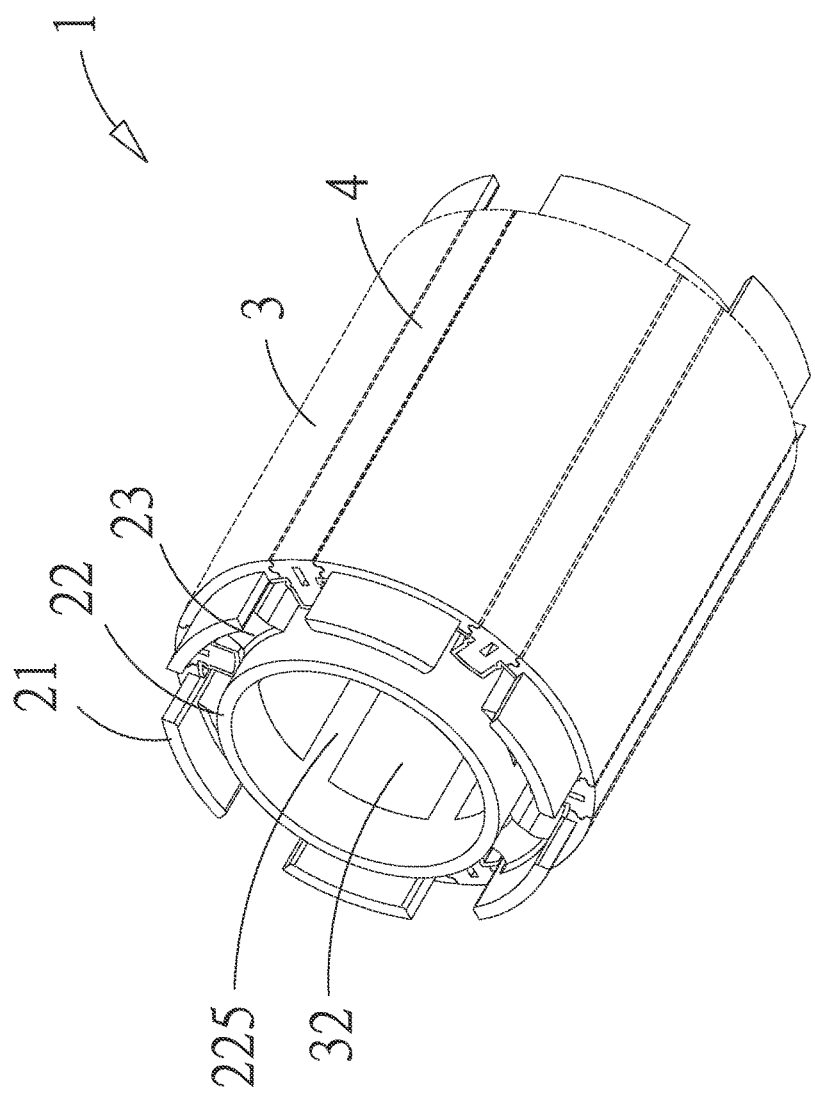
FIG. 2 is an assembly view of FIG. 1.
Figure 3:
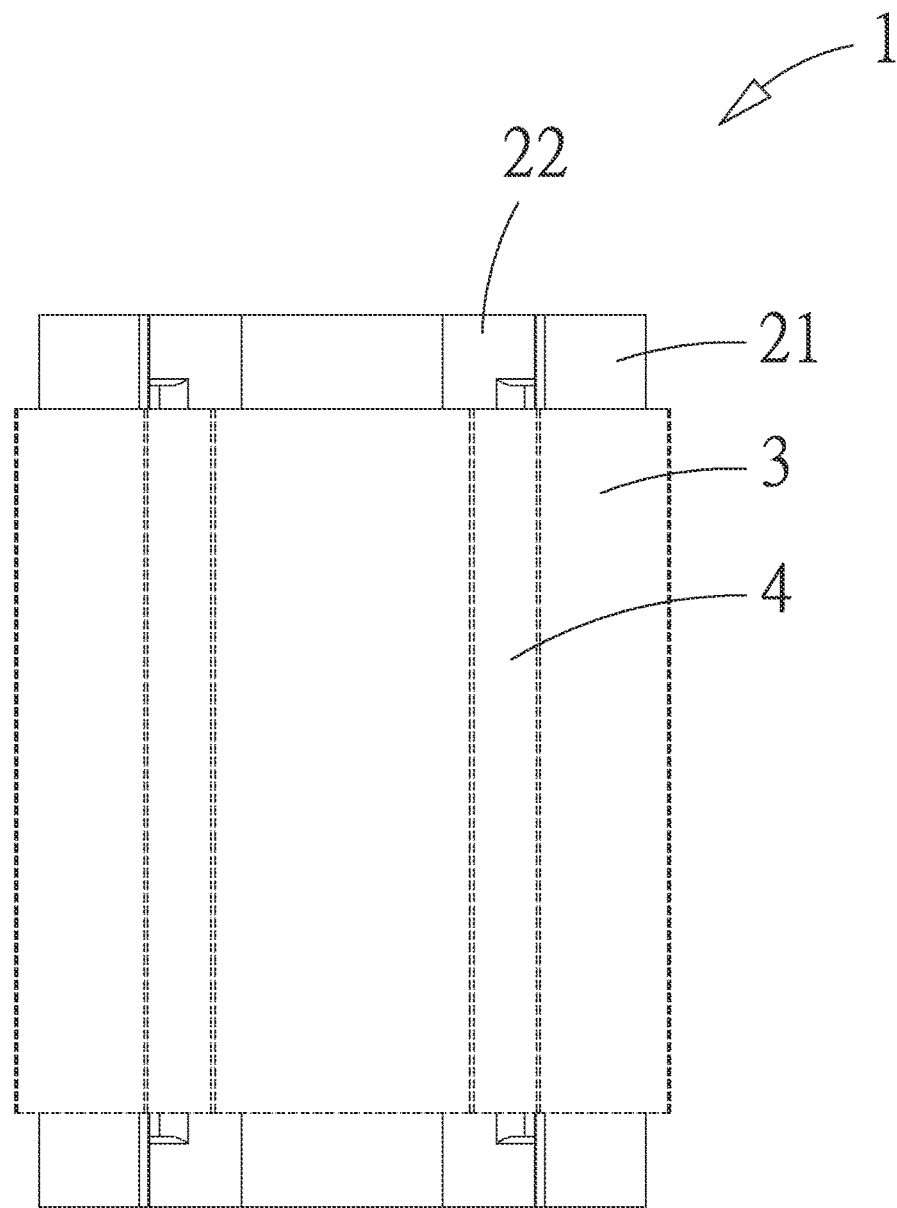
FIG. 3 is a front view of FIG. 2.
Figure 4:
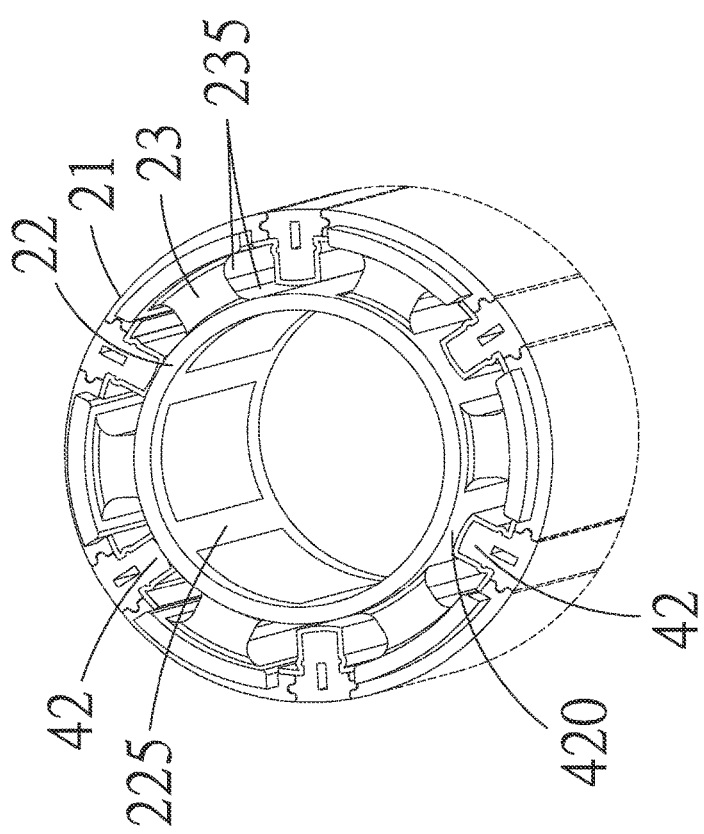
FIG. 4 is a schematic view of the motor stator device of the present invention.

Referring to FIG. 1 to FIG. 4, a motor stator device 1 of the present invention includes an insulating base 2, a plurality of stator segments 3 and a plurality of segment connectors 4. The insulating base 2 has a cylinder shape and encompasses a motor rotor (not shown). The insulating base 2 comprises an outer ring base 21, an inner ring base 22 and a connection base 23. The connection base 23 is secured between the outer ring base 21 and the inner ring base 22. The outer ring base 21 and the inner ring base 22 are arc and respectively form a plurality of outer ring openings 210 and a plurality of inner ring openings 220. The outer ring openings 210 and the inner ring openings 220 are communicated with each other to define holding spaces 230 inside the connection base 23. Further, the outer ring base 21 and the inner ring base 22 respectively form a plurality of outer ring sinks 215 and a plurality of inner ring pillars 225. The outer ring sinks 215 are alternatively arranged with the outer ring openings 210 on the outer ring base 21 while the inner ring pillars 225 are arranged with the inner ring openings 220 on the inner ring base 22.

The stator segments 3 are positioned on the insulating base 2. Each of the stator segments 3 is shaped by stacking a plurality of silicon steel sheets with same structure. Each of the silicon steel sheets has two separate convex ridges 35 thereon which are both rectangular in shape and mutually perpendicular in orientation so as to bring preferable stability in combination of the silicon steel sheets in injection molding. There are six stator segments 3 used in this embodiment; however, the quantity of the stator segments 3 varies with a required size of the motor stator device 1 in practice, e.g., three stator segments 3 used for a smaller size of the motor stator device 1, and eight stator segments 3 for a larger size of the motor stator device 1. Each of the stator segments 3 is arc and comprises an outer ring portion 31, an inner ring portion 32 and a connection portion 33. The connection portion 33 is secured between the outer ring portion 31 and the inner ring portion 32. The connection portion 33 is disposed in the holding space 230 while the outer ring portion 31 and the inner ring portion 32 are respectively butted on outer edges of the outer ring opening 210 and the inner ring opening 220 so that each of the stator segments 3 is positioned on the insulating base 2 firmly. Further, the outer ring portion 31 forms a concave slot 310 on its two opposite sides for the connection between the stator segments 3 and the segment connectors 4.

The segment connectors 4 are positioned on the outer ring sinks 215_between the insulating base 2 and the stator segments 3. Each of the plurality of segment connectors 4 is shaped by stacking a plurality of silicon steel sheets with same structure. Each of the silicon steel sheets has a convex ridge 45 which is rectangular in shape so as to bring preferable stability in combination of the silicon steel sheets. The segment connectors 4 have six in quantity to match with the quantity of the stator segments 3. Each of the segment connectors 4 is arc and has a base part 41 and an extension part 42 opposite to the base part 41. The base part 41 forms a convex column 410 on its two opposite sides for engagement with the concave slot 310 of the outer ring portion 31. The extension part 42 is integrally extended from the base part 41 and toward the motor rotor to get close to the inner ring pillar 225 next to the motor rotor, so that a tiny gap 420 (shown in FIG. 4) is formed between the extension part 42 and the inner ring pillar 225, wherein the tiny gap 420 has a width less than a fifth of a depth of the outer ring sink 215.

For manufacturing of the motor stator device 1, the stator segments 3 are arranged circularly at intervals in a mold (not shown) for plastic injection molding. The insulating base 2 is formed on the surface of the stator segments 3 such that the stator segments 3 are secured in the insulating base 2. The motor rotor is disposed in a closed room collectively surrounded by the inner ring base 22 of the insulating base 2 and the inner ring portion 32 of the stator segment 3 for smooth rotation.

After the plastic injection molding, winding operation is performed. The connection base 23 is wound with a metal coil through the outer ring sink 215 by a coil-winding machine (not shown). The insulating base 2 molded with the stator segments 3 forms the outer ring sink 215 located on both sides of the connection base 23 to allow the metal coil to enter therefrom for winding around the connection base 23. In addition, interfaces among the outer ring base 21, the connection base 23 and the inner ring base 22 are defined as arc curved faces 235.

After the winding operation, the segment connectors 4 are integrally molded on their surfaces for enhancing the insulating effect. Then, the segment connectors 4 are assembled into the outer ring sinks 215 of the insulating base 2 in order and the manufacture of the motor stator device 1 is completed.

Accordingly, the present invention has the following characteristics:

The extension part 42 blocks the magnetic lines of force formed between the metal coil and the motor rotor by being integrally extended toward the motor rotor to get close to the inner ring pillar 225 next to the motor rotor so as to decrease the cogging torque to improve the noise and energy waste.

The outer ring sink 215 on the insulating base 2 is located on both sides of the connection base 23 to allow the metal coil to enter therefrom for winding around the connection base 23, so as to improve the convenience and efficiency of the winding operation and thus to promote economic performance and market competitiveness.

Additionally, interfaces among the outer ring base 21, the connection base 23 and the inner ring base 22 are defined as arc curved faces 235 so as to expand winding space for facilitating winding operation.

It is understood that the invention may be embodied in other forms within the scope of the claims. Thus the present examples and embodiments are to be considered in all respects as illustrative, and not restrictive, of the invention defined by the claims.

What is claimed is:

1. A motor stator device with simple coil-winding structure encompassing a motor rotor, the motor stator device including:
   an insulating base comprising an outer ring base, an inner ring base and a connection base, the connection base being secured between the outer ring base and the inner ring base, the outer ring base and the inner ring base being arc and respectively forming a plurality of outer ring openings and a plurality of inner ring openings, the outer ring openings and the inner ring openings being communicated with each other to define holding spaces inside the connection base, the outer ring base and the inner ring base respectively forming a plurality of outer ring sinks and a plurality of inner ring pillars, the outer ring sinks being alternatively arranged with the outer ring openings on the outer ring base while the inner ring pillars being arranged with the inner ring openings on the inner ring base, the connection base being provided to be wound with a metal coil;
   a plurality of stator segments being positioned on the insulating base, each of the stator segments being shaped by stacking a plurality of silicon steel sheets with same structure, each of the stator segments being arc and comprising an outer ring portion, an inner ring portion and a connection portion, the connection portion being secured between the outer ring portion and the inner ring portion, the connection portion being disposed in the holding space while the outer ring portion and the inner ring portion being respectively butted on outer edges of the outer ring opening and the inner ring opening; and a plurality of segment connectors being positioned on the outer ring sinks between the insulating base and the stator segments, each of the segment connectors being shaped by stacking a plurality of silicon steel sheets with same structure, each of the segment connectors being arc and having a base part and an extension part opposite to the base part, the extension part being integrally extended from the base part and toward the motor rotor to get close to the inner ring pillar next to the motor rotor;

wherein a tiny gap is formed between the extension part and the inner ring pillar, wherein the tiny gap has a width less than a fifth of a depth of the outer ring sink.

2. The motor stator device of claim 1, wherein the outer ring portion forms a concave slot on its two opposite sides, and the base part forms a convex column on its two opposite sides to engage with the concave slot of the outer ring portion for the connection between the stator segments and the segment connectors.

3. The motor stator device of claim 1, wherein the quantity of the stator segments varies with a required size of the motor stator device in practice, e.g., three stator segments used for a smaller size of the motor stator device, and eight stator segments for a larger size of the motor stator device.

4. The motor stator device of claim 1, wherein interfaces among the outer ring base, the connection base and the inner ring base are defined as arc curved faces so as to expand winding space for facilitating winding operation.

5. The motor stator device of claim 1, wherein the segment connectors are integrally molded on their surfaces for enhancing the insulating effect.

6. The motor stator device of claim 1, wherein each of the silicon steel sheets of the stator segments has two separate convex ridges thereon which are both rectangular in shape and mutually perpendicular in orientation so as to bring preferable stability in combination of the silicon steel sheets in injection molding.

7. The motor stator device of claim 1, wherein each of the silicon steel sheets of the segment connectors has a convex ridge which is rectangular in shape so as to bring preferable stability in combination of the silicon steel sheets.

* * * * *